June 2, 1964

A. L. LENFANT 3,135,574

GRAPH RECORDERS

Filed Nov. 29, 1961

Inventor
André L. Lenfant
By Watson, Cole, Grindle & Watson

3,135,574
GRAPH RECORDERS

André L. Lenfant, Paris, France, assignor to Ateliers Vaucanson, Paris, France, a company of France Filed Nov. 29, 1961, Ser. No. 155,748
Claims priority, application France Dec. 24, 1960
5 Claims. (Cl. 346—23)

This invention relates to graph recording instruments of the type in which a record medium supported in a frame of the instrument is fed in one direction past one or more stylus members to which movements are imparted in another direction in response to a condition or conditions being recorded, so as to inscribe on said record medium one or more graphs representing the variations of said condition or conditions versus time.

The record medium may be an elongated band of paper fed longitudinally through the apparatus and the stylus means are then usually displaced transversely in response to the recorded condition; or the record medium may be a revolving disc and the stylus means are then usually displaced radially in response to the recorded condition; yet other arrangements are conceivable and are in use.

It is ordinarily required in connection with such recorders to provide in advance on the record media, one or more reference lines printed or otherwise inscribed thereon, extending parallel to the direction of feed of the medium, and serving as references for evaluating the value represented by any point of the graph after the record has been made. Frequently a plurality of such parallel reference lines are required, as for plotting the ordinates of the graph. This requirement not only increases the cost of the record media but also has a number of further drawbacks.

With such reference lines prepared in advance on the record medium, such as an elongated paper band, it is essential that the medium be guided with extremely high accuracy over its path of displacement in order that the reference lines will not drift towards one or the other side with respect to the zero position of the record stylus means, since otherwise reading errors would result. It is not always possible in practice to avoid such drifting and as a result the recorded curves may frequently be unreliable.

Moreover the fact that the record media are prepared in advance with reference lines makes them unsuitable for the recording of conditions, and for use in recorders, other than the particular condition and type of recorder for which the record medium was prepared. Frequently a considerable number of different recorder instruments are used simultaneously at a given installation and this involves the inconvenient necessity of storing a correspondingly large number of different kinds of recording media.

Objects of this invention are to obviate each and all of the inconveniences thus listed, and these objects are simultaneously accomplished by eliminating the need for providing reference lines in advance on a record medium and by providing instead of means for inscribing such reference lines concurrently with the inscription of the record graph itself.

The invention provides, in recording apparatus having a frame, means for feeding a record medium in one direction relative to said frame and recording stylus means supported on the frame for engagement with said medium and arranged for displacement relative to said frame in another direction in response to a variable condition being recorded, that improvement comprising additional stylus means supported in fixed relation to the frame and in engagement with said medium for inscribing thereon at least one reference line extending in said one direction concurrently with the inscription thereon of a graph of said condition.

An exemplary embodiment of the invention will now be described for illustrative purposes with reference to the accompanying drawings, wherein.

Figures 1, 2, 3, 4, 5, 6:
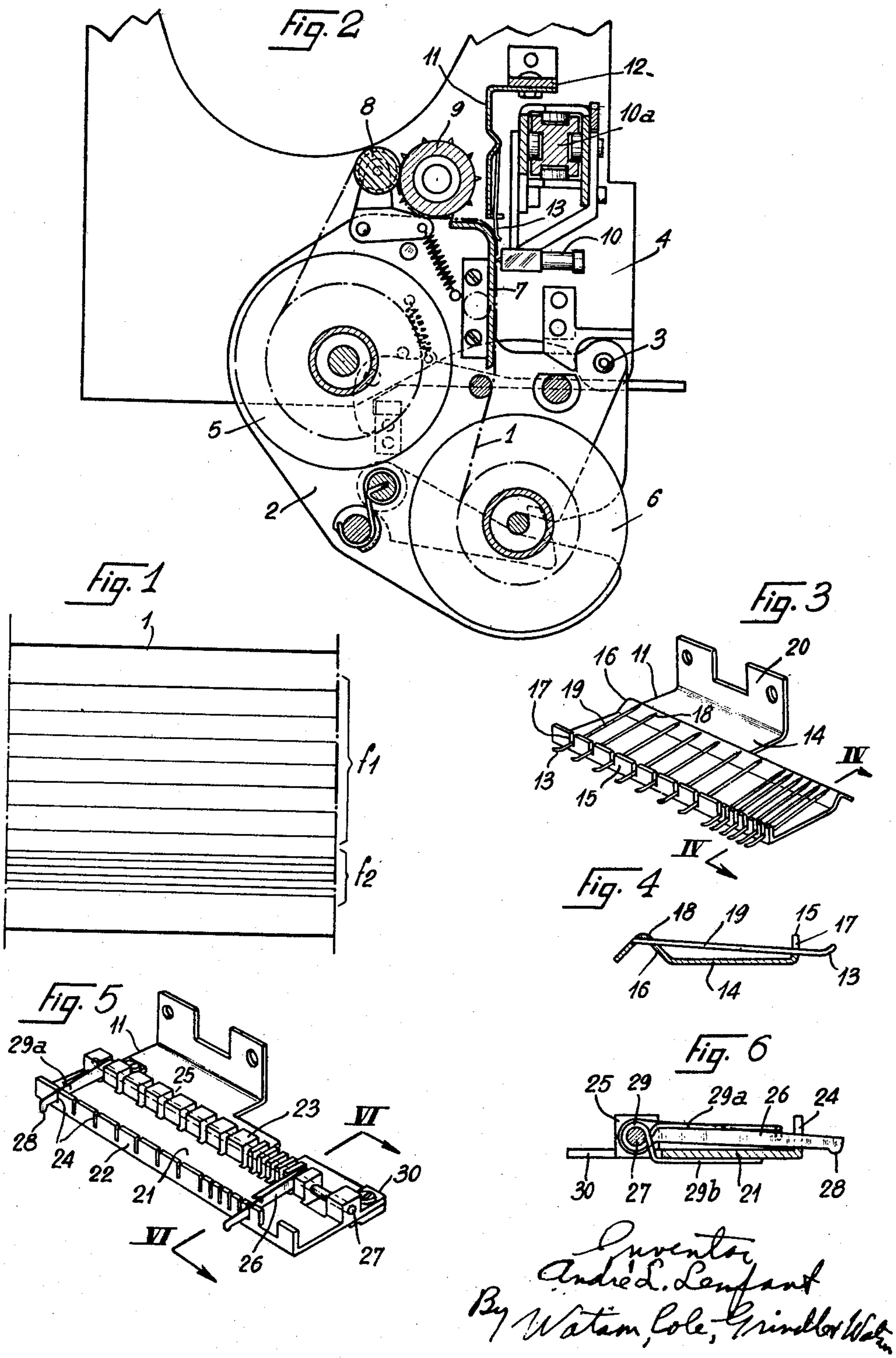
FIGURE 1 is a plan view of a portion of a record strip having a set of reference lines inscribed thereon.
FIGURE 2 is a partial sectional view showing a portion of recorder provided with the improvement of the invention.
FIGURE 3 is a perspective view of one form of attachment according to the invention.
FIGURE 4 is a section on line IV—IV of FIGURE 3.
FIGURE 5 is a perspective view of a modified attachment according to the invention.
FIGURE 6 is a section on line VI—VI of FIGURE 5.

Illustrated in FIGURE 1 is a section of band of paper 1 of the type currently used in connection with the recording of the speed and other varying conditions on a railroad engine. As shown, such band has two sets of parallel reference lines $f_1$ and $f_2$ recorded thereon; the set $f_1$ may serve to identify the ordinates of the velocity curve that is to be inscribed on the band when mounted in a suitable recorder, while the set $f_2$ may serve to inscribe a "herring-bone" line to indicate time, as is conventional. In the set of lines $f_1$ the spacing between adjacent lines may represent, for example, a velocity of say 10 kilometers per hour, while the spacing between adjacent lines of set $f_2$ may represent a given time of, say, 2 minutes. Of course, the pattern of reference lines selected in FIGURE 1 is merely exemplary and any other pattern may be used depending on applications.

FIGURE 2 illustrates a graph recorder of generally conventional type more fully described in French Patent No. 1,257,777 filed February 24, 1960, and which will only be briefly summarized here. The instrument comprises a pair of parallel spaced side flanges 4 with means for removably mounting therebetween a reeling unit generally designated 2 including the supply reel 5 and receiver reel 6, with the record tape 1, being initially wound on the supply reel 5 and being progressively reeled off in operation and taken up on reel 6 as presently appear. The record tape is of the well known kind whereon inscriptions are made by scraping. Recording media of this kind usually comprise a dark coloured supporting band or plate covered with a layer of a lighter coloured resin which may be easily scraped off by the point of a stylus. The tape 1 as it leaves reel 5 is passed around a presser roll 8 which applies it resiliently against a sprocket driver drum 9 supported on the recorder and driven through suitable means not shown. The tape 1 then passes over the surface of a writing table 7 forming part of the reel unit 2. The recorded instrument supports one or more recording stylus members 10 adapted to engage the surface of the tape 1 upon the writing table 7, and means (not shown) are provided for imparting to the stylus member or members 10 transverse displacements along a guide bar 10*a*, in response to the variable factor or factors to be recorded. It will be understood that the recorder thus briefly described and more fully described in the afore-mentioned patent application is but one example of conventional recorder instrument constructions to which the invention is applicable.

An attachment according to the invention is generally designated 11 and is removably affixed to a cross member 12 extending across the flanges 4 of the recorder. The attachment, as more clearly shown in FIGURES 3 and 4, comprises a supporting strip 14 having an upturned flange 15 along one of its longitudinal sides and a ridge 16 pressed into the strip along its opposite side parallel to the flange 15. Spaced notches 17 and 18 are formed at corresponding positions along the flange and the ridge and a plurality of similar stylus members 19 are inserted into corresponding pairs of slots so as to be supported in parallel spaced relation upon the strip, with their outer terminal ends protruding through the notches 17 in the flange 15. It will be understood that the spacing between the notches such as 17 is selected to correspond with the desired pattern of reference lines that are to be marked out on the record band 1, and it will accordingly be noted that in FIGURE 3 the stylus members 19 are supported in a pattern comprising one set having a larger pitch spacing corresponding to that of the reference lines $f_1$ and another set having a narrower pitch spacing corresponding to that of the reference lines $f_2$. Each stylus member 19 in this embodiment comprises a length of spring wire having one end wedged into a slot 18 formed in the ridge 16 (see FIGURE 4) and its other end beyond the notch 17 is formed with a rounded portion 13 for smooth resilient engagement with the paper sheet 1. A bracket 20 is secured to the under side of the supporting strip and is formed with holes for screw attachment to a flange 2 of the recorder instrument. The mounting is such that the active tips 13 of the stylus members bear under light spring pressure against the surface of the paper.

In the modified form of the attachment shown in FIGURES 5 and 6 the supporting strip 21 is again formed with an upturned and slotted flange 22 along one side, and has a notched rib 23 extending along the surface of the strip in a direction parallel to the flange. The slots 24 in the flange and notches 25 in the rib are arranged in corresponding pairs and are distributed in accordance with the pattern of reference lines to be inscribed on the record sheet 1 as in the first embodiment. Each stylus member in this case however is in the form of a strip 26 having substantial rigidity and having one end pivoted on a pivot rod 27 inserted through a hole formed through the rib 23 while its outer end protruding through a slot 24 in the flange is provided with a small rounded nose portion 28 on its under side for bearing against the paper. With each stylus member is associated a wire spring 29 which has an intermediate portion coiled around the rod 27, and has one leg 29 positioned to urge the member 26 downwardly i.e. against the paper surface and another leg 29*b* engaging the under side of the strip 21. The strip 21 is formed with lugs 30 for securing thereto a bracket similar to bracket 20 of FIGURE 3 whereby the attachment may be affixed to a flange of the recorder. In mounting this form of attachment the wire springs such as 29 are arranged to be slightly deflected in the mounted condition so as to force the stylus members under slight spring force against the paper surface.

The operation of the invention will be clearly apparent from the foregoing description. When the driver drum 9 is rotated as from a suitable motor the record strip 1 is fed from reel 5 to reel 6 and moves over the writing surface 7. The main stylus member or members 10 of the recorder is displaced by suitable means, not shown, in response to one or more variable factors being recorded, such displacement occurring transversely to the direction of feed of the paper band, and the tip of the main stylus member 10 is thereby caused to inscribe a graph upon the paper. Concurrently the auxiliary stylus members carried by the attachment of the invention are caused to inscribe straight reference lines parallel to the direction of feed and extending the length of the curve. It will be noted that the point of engagement of the auxiliary stylus members 13 with the paper is very close to the point of engagement of the main stylus member 10 upon the writing table surface 7 and hence any errors due to lateral shifting of the paper during the feed will affect both the curve and the reference lines by substantially equal amounts and will not introduce any appreciable errors in the readings. Hence, the feed mechanism may be constructed with wider tolerances and the manufacture of the recorders is facilitated and its cost reduced. Also, the record strips of paper may be made substantially narrower in transverse width than the related guide ways of the recorder, thereby eliminating the difficulties heretofore introduced by expansion of the paper due to atmospheric moisture and other similar defects.

Another advantage is that blank sheets may be provided for all types of recorders, obviating the necessity of keeping in stock a large variety of differently marked paper.

Various modifications may of course be conceived within the scope of the invention; for example, where some of the reference lines are desired to be heavier than others, the auxiliary stylus members used may have tips of varying thickness. While the embodiment illustrated uses a "scraping" or "scratching" type of stylus and record media, it is evident that the invention would be applicable to other types, e.g. utilizing inking means.

What I claim is:

1. Graph recorder apparatus having a frame, a writing table supported by said frame, means for feeding a record tape of the scrapable type in one direction over said writing table, stylus means to inscribe a record on the tape as the tape moves over said writing table, a support mounted on said frame and having adjacent said writing table a flange provided with a plurality of parallel guiding slots the medial planes of which are perpendicular to said writing table, a plurality of elongated stylus members connected at one end to said support and respectively guided near their other ends in said guiding slots and means for resiliently urging said other ends of said stylus members towards said writing table whereby reference lines may be inscribed onto record tape as it is fed through the apparatus.

2. A graph recorder apparatus as claimed in claim 1, wherein said support comprises a substantially plane portion, means parallel to said flange onto said portion for supporting said one end of said elongated stylus members, said portion being secured to said frame substantially in prolongation of said writing table, said stylus members being directed in the direction of feed of said tape.

3. Apparatus as defined in claim 1, wherein said support includes a rib parallel to said flange and one end of each of said elongated stylus members is affixed to said rib.

4. The combination of claim 3, wherein said stylus members are constituted by lengths of spring wire one end of which is secured to said rib and the other end is biased towards the bottom of said slot.

5. The combination of claim 3, wherein said stylus member comprises substantially rigid strips one end of which is hinged to an axle carried by said rib, a spring carried by said axle being associated to each strip for the purpose specified.

References Cited in the file of this patent

UNITED STATES PATENTS

| | | |
|---|---|---|
| 500,775 | Parenthou | July 4, 1893 |
| 1,116,444 | Kramer | Nov. 10, 1914 |
| 1,638,657 | Cox | Aug. 9, 1927 |
| 2,259,381 | Imbriani | Oct. 14, 1941 |